United States Patent [19]

Amano et al.

[11] 3,922,470

[45] Nov. 25, 1975

[54] PROCESS FOR PRODUCING MICROPOROUS VAPOR-PERMEABLE FILM OR SHEET

[75] Inventors: Masahiro Amano; Takashi Koike, both of Tokyo, Japan

[73] Assignee: Mitsubishi Paper Mills, Ltd., Japan

[22] Filed: Oct. 10, 1973

[21] Appl. No.: 405,080

[30] Foreign Application Priority Data
Oct. 11, 1972    Japan.............................. 47-101741

[52] U.S. Cl. ................ 428/425; 427/246; 427/336; 428/500; 260/2.5 AY; 428/317
[51] Int. Cl.² ...................... B05B 5/00; B32B 27/40
[58] Field of Search...... 117/135.5, 63; 260/2.5 AY; 427/246, 336; 428/425, 500, 317

[56] References Cited
UNITED STATES PATENTS
3,681,125    8/1972    Traubel............................ 117/135.5
3,692,570    9/1972    Traubel............................ 117/135.5

*Primary Examiner*—Michael R. Lusignan
*Attorney, Agent, or Firm*—Cushman, Darby & Cushman

[57] ABSTRACT

Microporous, vapor-permeable films or sheets are produced by mixing in a solution of polymers comprising a polyurethane elastomer as the essential constituent, with stirring and, if necessary, heating, a compound (I) having at least two basic nitrogen atoms in the molecule and at least two active hydrogen atoms attached thereto and a compound (II) having at least three NCO-groups in the molecule; or a compound (III) having at least two basic nitrogen atoms in the molecule and at least three active hydrogen atoms attached thereto and a compound (IV) having at least two NCO-groups in the molecule, thereby immediately reacting the compound (I) with the compound (II) or the compound (III) with the compound (IV) to prepare a dispersion of colloid particles having contained therein the polymers comprising a polyurethane elastomer as the essential constituent, impregnating a substrate with said dispersion of colloid particles or coating said dispersion on a substrate, then subjecting the dispersion to wet coagulation to coagulate the dispersion and remove the solvent and then removing the coagulating liquid.

19 Claims, 1 Drawing Figure

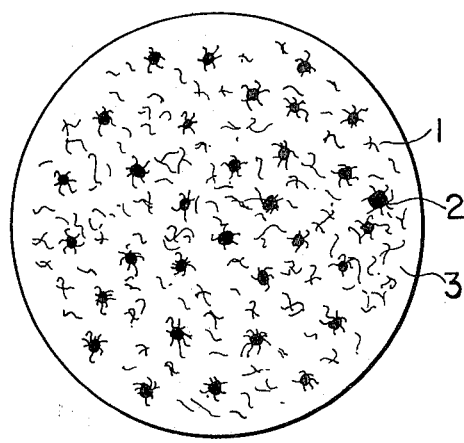

PROCESS FOR PRODUCING MICROPOROUS VAPOR-PERMEABLE FILM OR SHEET

This invention relates to a process for producing a microporous, vapor-permeable film or sheet by conducting such a reaction that colloid particles are formed, in an organic solvent solution of polymers comprising a polyurethane elastomer as the essential constitutent, to produce a dispersion of colloid particles having contained therein the resin comprising a polyurethane elastomer as the main constitutent, applying the resulting dispersion to a substrate by impregnation or coating, and then subjecting the dispersion to the so-called wet coagulation wherein coagulation is effected in a coagulating bath.

The microporous, vapor-permeable film or sheet comprising a polyurethane elastomer as the essential constituent has generally a great number of important uses. Above all, a sheet obtained by combining said microporous, vapor-permeable layer integrally with a woven or nonwoven fabric is particularly useful as a leather substitute.

The term "wet coagulation" used herein means a procedure conventionally employed for obtaining a microporous, vapor-permeable film or sheet which comprises introducing a solution of a polymeric material into a liquid (coagulating liquid) which is a nonsolvent for said polymeric material but is miscible with the solvent for said polymeric material, to coagulate the polymeric material and remove the solvent, and then removing the coagulating liquid.

The procedure of this wet coagulation is broadly classified into two. That is, one is the case where a porous substrate impregnated with said polymer solution is immersed in a coagulating liquid to coagulate the polymer thereby preparing a microporous sheet, and the other is the case where said polymer solution is coated on a substrate and then treated with a coagulating liquid to form a microporous, vapor-permeable layer on the surface of the substrate. In the latter case, the substrate may be a temporary support, and in this case, it may be removed from the resulting microporous, vapor-permeable film.

However, in the case where the solution of polymers comprising a polyurethane elastomer as the main constituent is subjected to wet coagulation treatment, a dense microporous skin is apt to be formed in the surface layer. Such a surface skin interferes with smooth progress of coagulation in the inner layer resulting in the formation of large voids in the inner layer. Thus, the vapor-permeability is decreased, the smoothness of the surface is deteriorated, and the film strength is markedly decreased. In addition, the removal of solvent requires a long period of time. As mentioned above, there are many disadvantages. In order to remove these disadvantages, various methods have been proposed, and some of them have been actually in use. Typical are a method (A-1) in which coagulating liquid is added to a solution of polymers comprising a polyurethane elastomer as the essential constituent until a colloidal state is reached, and a method (A-2) in which a coagulating liquid is further added until a liquid phase and a gel phase have been formed. Thereafter, in the method (A-1), a substrate is impregnated with said colloidal dispersion or the colloidal dispersion is coated on the substrate, and in the method (A-2) the gel phase is separated and adhered to a substrate. In both methods the substrate thus treated are then subjected to coagulation and removal of solvent.

Further, there is also known a method (B) wherein a solvent for polyurethane is added to the coagulating liquid in order to prevent rapid coagulation in the coagulation step.

Furthermore, there is known also a method (C) in which a substrate is impregnated with a solution of polymers comprising a polyurethane elastomer as the essential constituent, or the solution is coated on the substrate, then a coagulating liquid is applied in a thin thickness on the surface of the substrate and allowed to stand for a while, or, alternatively, a substrate similarly treated with said solution is exposed for a while to the vapor of a coagulating liquid, and then subjected to coagulation and removal of solvent with a coagulating liquid.

The method (A-1) is an excellent method, but it requires a strict control in the preparation of the colloid dispersion, particularly a strict control of temperature and humidity during preparation and storage. Even when the conditions are strictly controlled, there is still a considerable fluctuation between a batch and another. The method (A-2) has defects of poor strength and insufficient smoothness of the film. The method (B) is fairly effective but has many industrial disadvantages because a large volume of coagulating bath is necessary, a large amount of an expensive solvent is used, and a long time is required for coagulation and removal of solvent. Moreover, the method is not sufficiently effective unless it is carried out jointly with the method (A-1) or (C).

The method (C) is an effective method when applied to a relatively thin coating such as 50 $\mu$ or less thick, whereas for a coating having a thickness exceeding 100 $\mu$ it is ineffective and large voids are apt to be formed in the inner layer at the time of coagulation and removal of solvent with a coagulating liquid. If it is forced to carry out the method, an impracticably long time will be required.

Under the above circumstances, from the industrial viewpoint, there is earnestly demanded a process for producing a microporous, vapor-permeable film or sheet by means of a simple equipment, efficiently and at a low cost.

The present inventors have found a method for preparing such a solution of polymers comprising a polyurethane elastomer as the essential constituent that a homogenous microporous layer can be commercially produced with high efficiency, without formation of large voids due to ill-balance between the surface layer and the inner layer at the time of coagulation. By use of the said solution, the present inventors have succeeded in producing a microporous, vapor-permeable film or sheet free from the above-mentioned disadvantages and having a high vapor-permeability, a smooth surface and excellent physical strengths.

According to this invention, there is provided a process for producing a microporous, vapor-permeable film or sheet by wet coagulation from a solution of polymers comprising a polyurethane elastomer as the essential constituent, comprising adding to said solution, with stirring and, if necessary, heating, a compound (I) having at least two basic nitrogen atoms in the molecule and at least two active hydrogen atoms attached to said nitrogen atoms and a compound (II) having at least three NCO-groups in the molecule; or a compound (III) having at least two basic nitrogen atoms in the molecule and at least three active hydrogen atoms attached to said nitrogen atoms and a compound (IV) having at least two NCO-groups in the molecule, thereby immediately reacting the compound (I) with the compound (II) or the compound (III) with the compound (IV) to prepare a dispersion of colloid particles having contained therein said polymers comprising a polyurethane elastomer as the essential constituent, impregnating a substrate with said dispersion or coating said dispersion on a substrate, and then subjecting the applied dispersion to wet-coagulation.

The dispersion of colloid particles having contained therein the polymers comprising a polyurethane elastomer as the essential constituent, which is used in this invention, is illustrated by referring to the accompanying drawing, which is a schematic drawing showing the state of the said dispersion of colloid particles.

As is understandable from the drawing, on being mixed together, with stirring and, if necessary, heating, the compounds (I) and (II) or the compounds (III) and (IV) react immediately with each other to form a dispersion of colloid particles 2 having contained therein a part of the already dissolved polymers 1 comprising a polyurethane elastomer as the essential constituent, the molecules of the contained polymers being embedded in said colloid particles either completely or partly. The thus formed dispersion of colloid particles is a dispersion of very stable colloid particles which have fiber-like whiskers of the dissolved polymers comprising a polyurethane elastomer as the essential constituent and are thoroughly solvated with the solvent 3.

Moreover, the remainder of the polymers comprising a polyurethane elastomer as the essential constituent which has not been contained in the insoluble colloid particles formed by the reaction of the compound (I) with the compound (II) or of the compound (III) with the compound (IV) exists as dissolved in the solvent and serves as a protective colloid for the dispersion of colloid particles, thus contributing to further stabilization of this dispersion of colloid particles.

Obviously, the substance formed by the reaction between the compound (I) and the compound (II) or between the compound (III) and the compound (IV) cannot be a linear (thread-like) high polymer, contrary to the reaction bifunctional compounds, but is a solvent-insoluble compound having a threedimensional structure and a relatively low molecular weight.

On the other hand, as compared with the reaction between the compounds (I) and (II) or between the compounds (III) and (IV), the reactions of an active hydrogen atom or a hydroxyl group which the already dissolved polymers comprising a polyurethane elastomer as the essential constituent has, with the compounds (II) and (IV) added later proceed so slow as can be neglected.

As will be mentioned hereinafter, the molar ratio of NH to NCO is greater than 1. The dispersion of colloid particles prepared as mentioned above is so stable that it can be stored for a long period of time and it is also stable to temperature changes.

Furthermore, when a substrate is impregnated with the said dispersion of colloid particles or the dispersion is coated on the substrate and the dispersion is then subjected to coagulation and removal of solvent in a coagulating bath, the already formed colloid particles act as coagulation nuclei to allow smooth coagulation of both the outer part and the inner part of the coagulated layer. Consequently, the progress of the removal of solvent is surprisingly rapid and yet the resulting layer has a substantially uniform microporous structure from the outer part to the inner part without formation of large voids in the inner part, so that there is obtained a film or a coating having a high vaporpermeability, a smooth surface, and excellent physical strengths. Further, to the above-said dispersion of colloid particles may be applied in combination the aforesaid methods (A-1), (B), and (C) to further enhance the effectiveness of the dispersion. Particularly, exposure to the vapor of a coagulating agent for 2 to 3 minutes according to the method (C) markedly accelerates subsequent coagulation or removal of solvent.

The polyurethane may be contained in any proportion, preferably in a proportion of at least 50 percent by weight, in the polymers.

The polyurethane elastomers for use in this invention are those which are obtained by the reaction of a soft-segment component such as a polyester diol, polyether diol, or polyether-ester diol, an organic diisocyanate, and a chain extender such as, for example, a diol, diamine, or hydrazine. Such polyurethane elastomers have rubber-like elasticity and are soluble in specific solvents. Other polymers such as, for example, polyvinyl chloride, polyvinyl acetate, acrylonitrile-butadiene rubber, styrenebutadiene rubber and acrylic polymers may be added to the solution containing the said polyurethane elastomer as the essential constituent. Also, if necessary, pigments (inorganic or organic), dyes, plasticizers, or filler materials such as powdered cellulose or powdered leather may be added to said solution without causing any trouble.

Suitable substances for use as a solvent include dimethyl-formamide, dimethylacetamide, diethylformamide, dimethylsulfoxide, etc. As a coagulating liquid, there may be used water, ethanol, methanol or the like, but water is most suitable in view of handling and low cost.

Among the compounds for use in the reaction to form colloid particles, which constitutes the main part of this invention, in a solution of polymers comprising a polyurethane elastomer as the essential constituent, those which correspond to the compounds (I) and (III) are, for example, N,N'-dialkyldiamines such as N,N'-dimethylhydrazine, N,N'-dimethylethylenediamine, etc.; N-monoalkyldiamines such as N-methyl-1,3-diaminopropane, and the like; aliphatic amino compounds such as ethylenediamine, diethylenetriamine, triethylenetetramine, polyethylenepolyamine, propylenediamine(1,3), dipropylenetriamine, polypropylenepolyamine, and tetramethylenediamine(1,4); and aromatic amino compounds such as m-phenylenediamine, diaminodiphenylmethane, diaminodiphenylsulfone, etc. Polyamide resins having nearly the same amine value as those generally used as a cross-linking agent for epoxy resins may also be used.

Preferable compounds corresponding to the compounds (II) and (IV) are, for example, 1,4-tetramethylene diisocyanate, 1,6-hexamethylene diisocyanate, 1,4-cyclohexane diisocyanate, m- and p-phenylene diisocyanates, 2,4- and 2,6-tolylene diisocyanates, mixtures of isomers of these diisocyanates, and derivatives of these diisocyanates. Further, a reaction product of 1 mole of trimethylolpropane and 3 moles of tolylene diisocyanate(2,4), and a derivative of hexamethylene diisocyanate having the formula, $OCN-(CH_2)_6-N[CO-NH(CH_2)_6NCO]_2$ are also preferable.

As to the combination of the above-said amino compound and the isocyanate compound, it is necessary to select the two in such a combination that when both compounds in a molar ratio of NH/NCO ≧ 1 are added with stirring and, if necessary, heating, to a solution of the polymers comprising a polyurethane elastomer as the essential constituent, a rapid reaction takes place immediately to produce insoluble colloid particles having contained therein the polymers comprising a polyurethane elastomer as the essential constituent. The solution of the polymers comprising a polyurethane elastomer as the essential constituent is preferably used in a resin content of 5 to 30 percent by weight.

It seems that because of immediate and rapid reaction, the colloid particles grow in the state that the dissolved polymers comprising a polyurethane elastomer as the essential constituent is contained in the particles.

The molar ratio of both components which are added and mixed should satisfy the relation NH/NCO ≧ 1, because if the ratio is smaller than 1, the unreacted NCO which remains in the film will cause such troubles as stickiness of the film after it has been produced, formation of undesirable bubbles in the film due to reaction with atmospheric moisture, and deterioration in surface smoothness and hand of the film.

A preferable molar ratio, NH/NCO, is generally from 2 to 5, though it may be varied within a board range as far as it is 1 or more, depending on the type of amino compounds. The amount of both components to be added is preferably such that the amount of insoluble colloid particles formed by adding and mixing the compounds (I) and (II) or the compounds (III) and (IV) is 5 to 40 percent by weight based on the weight of the dissolved polymers comprising a polyurethane elastomer as the essential constituent. If the amount is below 5 percent by weight, the effect will be insignificant, while if the amount exceeds 40 percent by weight marked decrease in physical strengths of the microporous, vapor-permeable film will result.

The invention is further specifically explained below with reference to Examples which are, however, merely by way of illustration and not by way of limitation.

EXAMPLE 1

To one liter of a 15 percent by weight solution of a polyurethane (Paraprene 22 S pellet, polyesterurethane, produced by Nippon Polyurethane Industry Co., Ltd., specific gravity: 1.21; hardness (JIS K-6301): 82; 100 percent modulus (JIS Z-8807): 43 Kg/cm$^2$) in dimethylformamide (referred to hereinafter as DMF) was added with slowly stirring at room temperature 100 ml of a 1.5 g/liter solution of (III) diethylenetriamine in DMF, then followed by 100 ml of a 323 g/liter solution of (IV) a reaction product (Coronate L, produced by Nippon Polyurethane Industry Co., Ltd., specific gravity: 1.16 – 1.18; NCO content: 12.7 – 13.7 mole percent) of 1 mole of trimethylolpropane and 3 moles of tolylene diisocyanate. Reaction took place at the moment of addition and mixing to form a dispersion of colloid particles having contained therein the polyurethane.

The dispersion was coated in a thickness of 1.5 mm of a nonwoven fabric under an atmosphere of 25°C, 65 percent RH, allowed to stand as such for 3 minutes, then immersed in water at 25°C for 2 minutes to effect coagulation, and further allowed to stand in a stream of water for 20 minutes to remove the solvent. Thereafter, the fabric was thoroughly squeezed by means of squeezing rolls and then dried at 120°C.

The resulting coated fabric was an excellent leather-like sheet having a thickness of 250 μ and uniform many micropores from the surface layer to the inner layer and a moisture permeability of 9.3 mg/cm$^2$/hour (according to JIS K 6549).

The same procedure as above was repeated, except that the said colloidal dispersion had been allowed to stand in a closed vessel in a room for one week, thereafter taken out of the vessel and slightly stirred before the experiment to obtain the same coated fabric.

COMPARATIVE EXAMPLE 1

Water was added to the 15 percent by weight solution of the polyurethane in DMF used in Example 1 (25°C) until a colloidal dispersion was obtained.

The thus obtained dispersion was subjected to the same procedure as in Example 1 to obtain a coated fabric having relatively uniform micropores in the inner layer of the coating though large voids existed here and there therein, in the water-containing state before drying. However, when dried, the micropores were collapsed and the coating became partly film-like. This film-like coating had a thickness of about 150 μ and a moisture-permeability of 1.3 mg/cm$^2$/hour. This is because the solvent was not sufficiently removed and the residual DMF made the coating film-like. The coating was further washed in a stream of water for one hour, and subjected to the test to find that the product was unsatisfactory. The above colloidal dispersion was allowed to stand in a closed vessel in a room for one week, thereafter taken out of the vessel and subjected to the same experiment. However, the dispersion was separated into a gel layer and a liquid layer, which were not formed into a dispersion by stirring, so that no test could be conducted.

EXAMPLE 2

To one liter of a 15 percent by weight solution in DMF of a mixture (8:2) of a polyurethane resin (Elastollan E 5080 polyester-urethane, produced by Nippon Elastollan Co., Ltd., specific gravity: 1.16; hardness (JIS K-6301): 80 ± 5; 100 percent modulus (JIS Z-8807): 50 kg/cm$^2$) and a polyvinyl chloride (Geon 103 EP-8, produced by Nippon Geon Co., Ltd., average degree of polymerization: 800) was added with stirring and heating at 80°C 200 ml of a 44 g/liter solution in DMF of (I) N,N'-dimethylethylenediamine, and then 100 ml of the 325 g/liter solution in DMF of (II) Coronate L used in Example 1. Reaction took place immediately and a milky white dispersion of colloid particles was obtained. A needle-punched nonwoven fabric, basis weight being 250 g/m$^2$, was impregnated with the above dispersion which had been cooled to 25°C. The squeezing roll pressure was regulated so that the amount of the absorbed resin became 50 percent by weight based on the weight of the nonwoven fabric. The resulting mat was immediately immersed in water at 25°C. for two minutes to effect coagulation and reomve the solvent, lightly squeezed by means of squeezing rolls, and further allowed to stand in a stream of water for fifteen minutes. The mat was then squeezed thoroughly by means of squeezing rolls, and dried at 120°C.

The mat thus treated was a substrate in the sheet form, which was very flexible and had no appreciable creases resulting from folding and a good air-permeability (moisture-permeability, 20.8 mg/cm²/hour).

The substrate in the sheet form obtained above was passed through a nip of rolls heated at 120°C to smoothen the surface. In a manner similar to that in Example 1, the substrate was further coated with the said dispersion of colloid particles, subjected to coagulation and removal of the solvent, and dried to obtain a sheet having a microporous, vapor-permeable layer on the surface and resembling a leather, and having a moisture-permeability of 8.7 mg/cm²/hour. The storage stability of the dispersion was also excellent.

EXAMPLE 3

To one liter of a 15 percent by weight solution in DMF of a polyurethane (Leathermin Cu-313. polyester-urethane, produced by Dainichiseika Co., Ltd., specific gravity: 1.25; 100 percent modulus (JIS Z-8807): 65 kg/cm²) was added with stirring and heating at 70°C 100 ml of a 250 g/liter solution in DMF of (III) of polyamide resin (K-50, amine value 220 ± 15 produced by Showa Kobunshi Co., Ltd.; amine value, 220 ± 15), then 100 ml of a 73 g/liter solution in DMF of (IV) 2,4- and 2,6-tolylene diisocyanate. Reaction took place instantly and the clear solution turned into a milky white dispersion of colloid particles when the reaction was completed. In a manner similar to that in Example 1, said dispersion which had been cooled to room temperature was coated on a non-woven fabric, subjected to coagulation and removal of the solvent, and dried to obtain a leatherlike sheet having a thickness of 230 μ and a moisturepermeability of 7.8 mg/cm²/hour.

The stability of the dispersion of colloid particles was also good.

EXAMPLE 4

To one liter of a 15 percent by weight solution in DMF of a polyurethane (Estan 5714F1, polyetherurethane, of B. F. Goodrich Chemical Company, Shore hardness: 80A, viscosity at 25°C of a 15 percent solution in tetrahydrofuran: 600–1200 cps) was added 100 ml of a 37 g/l. solution in DMF of (III) propylenediamine(1,3) and then 150 ml of a 336 g/l. solution in DMF of (IV) a derivative of hexamethylene diisocyanate (Coronate HL of Nippon Polyurethane Industry Co., Ltd., specific gravity: 1.085, NCO content: 12–13 mole percent) was added thereto. Reaction took place at the moment of addition and mixing to form a dispersion of colloid particles having contained therein the polyurethane.

The dispersion was coated in a thickness of 1.5 mm on a polyester film which is a temporary support, immersed in a water/DMF(8/2) mixed liquid at 20°C for 2 min, and then allowed to stand in a stream of water for 20 min to remove the solvent, after which the coating film was separated from the polyester film, lightly squeezed by means of squeezing rolls and then subjected to tentor-drying at 105°C. The thus obtained coating film was smooth on both sides and had uniform porous structure from the surface to the interior, a moisture-permeability of 11.3 mg/cm²/hr, a tensile strength of 0.95 kg/mm² and a density of 0.45 g/cm³.

The resulting film such as is useful as a filtering membrane or the like. Further, it can be bonded to the fluffed surface of a waven fabric having one fluffed side to obtain an excellent leather substitute.

What is claimed is:

1. A process for producing microporous, vapor-permeable film or sheet by wet coagulation from a solution of polymers comprising a polyurethane elastomer as at least 50 percent by weight of the polymers in solution comprising adding to said solution with stirring, a compound (I) having at least two basic nitrogen atoms and at least two active hydrogen atoms attached thereto and a compound (II) having at least three NCO-groups; or a compound (III) having at least two basic nitrogen atoms and at least three active hydrogen atoms attached thereto and a compound (IV) having at least two NCO-groups, thereby immediately reacting the compound (I) with the compound (II) or reacting the compound (III) with the compound (IV) to prepare a dispersion of colloid particles having contained therein said polymers comprising a polyurethane elastomer, impregnating a substrate with said dispersion or coating said dispersion on a substrate, the coagulating said dispersion and then removing the coagulating liquid, the molar ratio in the reaction between said compound I and compound II and between said compound III and compound IV being NH/NCO ≧ 1.

2. A process according to claim 1, wherein the amount of the compounds (I) and (II) or of the compounds (III) and (IV) is such that the amount of the insoluble colloid particles formed is 5 to 40 percent by weight based on the weight of the polymers comprising a polyurethane elastomer.

3. A process according to claim 2 comprising first adding said compound I or III and then adding said compound II or IV.

4. A process according to claim 2 wherein the colloidal particles contain fiber-like whiskers of dissolved polymers.

5. A process according to claim 1, wherein the compound (I) and the compound (II); or the compound (III) and the compound (IV) are mixed with heating.

6. A process according to claim 2, wherein the substrate is a woven fabric or a nonwoven fabric.

7. A process according to claim 2, wherein the substrate is a temporary support.

8. A process according to claim 2, wherein the polyurethane elastomer is obtained by reacting a polyester diol, a polyether diol, or a polyetherester diol; an organic diisocyanate; and a diol, a diamine, or a hydrazine.

9. A process according to claim 2 wherein the solution of polymers comprising a polyurethane elastomer is a solution in dimethylformamide, dimethylacetamide, diethylformamide, or dimethyl sulfoxide.

10. A process according to claim 2, wherein the solution of polymers comprising a polyurethane elastomer contains polyvinyl chloride, polyvinyl acetate, acrylonitrilebutadiene rubber, styrene-butadiene rubber or acrylic polymers.

11. A process according to claim 2, wherein the compound (I) or (III) is selected from the group consisting of N,N'-dimethylhydrazine, N,N'-dialkyldiamines, N-monoalkyldiamines, aliphatic amino compounds, aromatic amino compounds, and polyamide resins having nearly the same amine values as those of polyamide resins for use as cross-linking agents for epoxy resins.

12. A process according to claim 2, wherein the compound (II) or (IV) is selected from the group consisting of 1,4-tetramethylene diisocyanate, 1,6-hexamethylene diisocyanate, 1,4-cyclohexane diisocyanate, m-phenylene diisocyanate, p-phenylene diisocyanate, 2,4-tolylene diisocyanate, 2,6-tolylene diisocyanate, mixutres of these isomers, reaction products of 1 mole of trimethylolpropane and 3 moles of 2,4-tolylene diisocyanate, and a compound having the formula OCN$+$CH$_2\overline{)_6}$N$-$[CO-NH$-$(CH$_2\overline{)_6}$NCO]$_2$.

13. A process according to claim 2, wherein the ratio NH/NCO is 2 to 5.

14. A process according to claim 2, wherein the solution of polymers comprising a polyurethane elastomer contains 5 to 30 percent by weight of the polymers.

15. A process according to claim 6, wherein the substrate is impregnated with the dispersion.

16. A process according to claim 6, wherein the substrate is coated with the dispersion.

17. A process according to claim 7, wherein the substrate is coated with the dispersion, and removed from the resulting microporous, vapor-permeable film.

18. A microporous, vapor-permeable film or sheet obtained by the process according to claim 1.

19. The microporous, vapor-permeable film or sheet obtained by the process according to claim 2.

* * * * *